United States Patent Office

2,916,531
Patented Dec. 8, 1959

2,916,531

DEHYDROGENATION OF HYDROCARBONS

Warren E. Armstrong, Lafayette, and Carroll Z. Morgan, Alameda, Calif., assignors to Shell Development Company, New York, N.Y., a corporation of Delaware No Drawing. Application February 17, 1959
Serial No. 793,681

6 Claims. (Cl. 260—669)

This invention relates to an improvement in the dehydrogenation of unsaturated hydrocarbons such, for example, as the dehydrogenation of butenes to butadiene.

While butadiene may be produced by several methods, one chief method is through the catalytic dehydrogenation of butenes in the presence of a large amount of superheated steam with a catalyst consisting to a large extent of iron oxide and potassium carbonate. This method in its present commercial application uses a catalyst consisting of a large proportion of iron oxide, a generally lesser but substantial proportion of potassium carbonate and generally a small amount of a stabilizer, usually chromium oxide, and when using this catalyst the process has the important advantage that it may be carried out continuously without the necessity of regenerating the catalyst at frequent intervals.

In this process the matter of selectivity of action is of greater importance than the activity and conversion. Selectivity may be defined as 100 times the moles of desired product formed per mole of feed hydrocarbon destroyed or converted. The importance of the selectivity is due to the fact that the feed is not an inexpensive petroleum fraction but a substantially pure and costly chemical, e.g. n-butene-2. The above-described commercial method is not as selective as would be desired. As the conversion is increased the selectivity decreases and for this reason it is the practice to operate at quite low conversion levels. Since the practicality of any given dehydrogenation process depends on a relatively narrow margin of production and cost of feed any improvement in the selectivity that can be gained is greatly to be desired.

It has been discovered that the catalyst of the described type when used in the presence of superheated steam to effect the dehydrogenation of unsaturated hydrocarbons such as butenes, ethyl benzene and the like, afford improved selectivity if there is incorporated in the catalyst as an additional component a small but limited amount of silica. The finished catalyst composition contains at least about 35% of an iron oxide calculated at $Fe_2O_3$, at least one potassium compound (other than the chloride) which is at least partially convertible to potassium carbonate under the dehydrogenation conditions, i.e. in the presence of a small amount of $CO_2$ and at a temperature above 580° C., in an amount equivalent to at least 6% $K_2CO_3$ and in addition dispersed throughout the catalyst from 0.5 to about 6% of silica, the percentages being based on the weight of the total of the aforementioned components. The catalyst may also contain a small amount, e.g. 0.5 to 10% of a difficultly reducible heavy metal oxide to stabilize the oxidation state of the iron although such oxide is not necessary in all cases. Preferred ranges of ingredients are 45–85% of iron oxide calculated as $Fe_2O_3$, 15–55% of potassium calculated as $K_2CO_3$, from 0.5 to 4% of silica, and from 1 to 4% of the mentioned heavy metal oxide if it is used.

The above proportions are given with the amount of iron oxide calculated as $Fe_2O_3$ for convenience. However, under the conditions of use in the dehydrogenation the iron oxide, if initially $Fe_2O_3$, becomes reduced to an oxide closer to the formula of magnetite, i.e. $Fe_3O_4$.

Although the difficultly reducible heavy metal oxide is not necessary in preparing active catalysts and contributes little, if anything, to the activity of the catalyst its presence is often beneficial in stabilizing the iron oxide. Some of the oxides of this type which may be used in the preparation of the catalyst are those of chromium, manganese, bismuth, tungsten, molybdenum, vanadium and cerium.

The potassium compund used in the preparation of the catalyst is preferably potassium carbonate. However, any compound other than the chloride which is at least partially convertible to the carbonate either under the conditions of the preparation of the catalyst or under its initial conditions of use may be used. Examples of such compounds are the hydroxide, nitrate, fluoride, bicarbonate and acetate.

The silica added in the catalyst of this invention is mainly associated with the potassium carbonate phase of the catalyst and is to be distinguished from silica sometimes occurring as an impurity in the iron oxide used in making the catalyst. Catalysts have been made using iron oxide containing silica as an impurity in concentrations ranging from the merest traces up to about 15%. It was found that silica as an impurity in the iron oxide exerts no noticeable effect when present in concentrations of 0.5% or below while all catalysts made with iron oxides containing 1% or more silica impurity gave poor results. The silica should be incorporated in a form which is either potassium silicate or capable of reacting to a reasonable extent with the potassium carbonate to form potassium silicate under the conditions of heating and/or use of the catalyst.

Silica present in the form of sand has no effect other than that of an inert diluent. Silica present in the form of a silica xerogel carrier or base exerts a detrimental effect.

The silica may be added in any of various forms whereby it may be intimately incorporated with the remaining ingredients. The preferred forms are aqueous solutions of soluble silicates such as alkali metal silicates, silica sols, silica hydrogel and freshly precipitated silicic acid. It is also possible to incorporate the silica by incorporating an easily hydrolyzable compound of silica and hydrolyzing the compound in situ. Other suitable methods whereby the silica is intimately dispersed in the potassium carbonate phase or impregnated on the catalyst surface will be apparent. A convenient method of incorporating the silica in the catalyst is as an aqueous solution of an alkali metal silicate, preferably potassium silicate. If potassium silicate is used the potassium compound primarily used in the preparation of the catalyst to provide the potassium promoter may be reduced in an amount equivalent to the potassium added with the silica.

A preferred method for preparing the catalyst is to ball-mill or otherwise thoroughly mix or grind together the mentioned catalyst components along with a small amount of water to form a mixture which is then extruded into pellets, dried and calcined. The catalyst may, however, be prepared by means of co-precipitation of the iron hydroxide or carbonate along with the remaining constituents followed by drying, pelletting and calcining. Also the iron oxide or hydroxide starting material may be formed into pellets which are then impregnated with the other components.

The iron oxide used in making the catalyst is preferably a precipitated iron oxide but the so-called R type iron oxide made by calcining ferrous sulfate may be used. If the precipitated iron oxide (hydroxide) is of the usual type it is first calcined to reduce its surface to below about 10 m.²/g., preferably to about 2–6 m.²/g. The so-called RO type iron oxide made by a special precipitation technique (see U.S. 2,785,991) has a low surface area and does not require precalcination.

The catalyst prepared as described and having the potassium present predominantly as potassium carbonate tends to lose strength upon exposure to air. One method for overcoming the difficulty is to treat the catalyst with carbon dioxide in the presence of water under conditions to convert the potassium carbonate predominantly to the bicarbonate. Upon heating the catalyst in the reactor preparatory to its use the bicarbonate decomposes to the carbonate.

The catalyst may also contain a minor amount of a bonding agent, e.g. a resin, graphite, or the like and the expression "consisting substantially entirely" is intended not to exclude such bonding agents.

The catalyst may be in the form of granules, pellets, powder, spheres, saddles, etc. Cylindrical pellets of $\frac{1}{16}$ to $\frac{3}{4}''$ diameter and $\frac{1}{16}$ to $1''$ in length can be used. However, the smaller sizes below about $\frac{3}{16}''$ in the longest dimension are preferred.

The catalyst of the invention is also useful for the catalytic dehydrogenation with steam of unsaturated hydrocarbons other than butylene and ethyl benzene mentioned above. Thus, the process is equally applicable for the dehydrogenation of isoamylene to isoprene, the dehydrogenation of isopropylbenzene to alpha-methyl styrene and similar dehydrogenation of olefins and alkyl aromatic hydrocarbons to the corresponding diolefinic and vinyl aromatic products.

The dehydrogenation is effected by passing vapors of the unsaturated hydrocarbon feed (continuously or substantially continuously) along with at least 2 and preferably from 5 to 30 moles of superheated steam in contact with the catalyst. The temperature is between about 580 and 700° C. The pressure is preferably not substantially above 30 p.s.i.g. and may be atmospheric pressure or below. The gaseous hourly space velocity of the hydrocarbon is between about 200 and 3000 and is preferably adjusted within this range to effect the degree of conversion desired for the particular feed in question.

*Example I*

A base mix was prepared by thoroughly mixing 1000 parts of $Fe_2O_3$, 35.5 parts of $Cr_2O_3$ and 566 parts of $K_2CO_3$. To 160.2 parts of this base mix was added 8.1 parts of an aqueous solution of potassium trisilicate containing 10.6% potassium and 26.7% $SiO_2$ by weight and 20 parts of water and the mass was again mixed thoroughly. The resulting composition was extruded into $\frac{1}{8}''$ pellets which were dried at 110–120° C. and calcined for 2–3 hours at 600° C. This catalyst contained, on the basis of the initial materials used in the preparation, 62.0% $Fe_2O_3$, 2.2% $Cr_2O_3$, potassium mostly as the carbonate equivalent to 24.1% $K_2O$ and 1.3% silica with the remainder as $CO_2$ in the carbonate.

Additional catalysts from the same base mix were prepared, one containing no silica which was used as a control and the others containing 0.7, 2.6, 3.8, 4.9 and 6.1% silica, the percentages being by weight of the total of the solid ingredients used in the preparation.

To illustrate the superiority of the iron oxide catalyst modified with specific amounts of silica the catalysts prepared according to the foregoing example were tested in the dehydrogenation of 2-butenes to butadiene. The butene was passed with 12 volumes of superheated steam through a tubular reactor at a gaseous hourly space velocity of 500 and at a different temperature ranging between 620 and 660° C. The selectivities for butadiene with the various catalysts at 35% conversion are summarized in the following table.

| Percent wt. silica: | Selectivity for butadiene at 35% conversion |
|---|---|
| 0 | 75.5–75.9 |
| 0.7 | 78.9–79.1 |
| 1.3 | 78.8–79.2 |
| 2.6 | 78.8–78.8 |
| 3.8 | 79.3–79.2 |
| 4.9 | 77.6–78.0 |
| 6.1 | 75.8–75.5 |

These values were obtained by running the reaction at 620, 640 and 660° C. with each catalyst and analyzing the resulting product streams.

The rate of conversion obtained at each temperature was plotted against the mole percent selectivity and the resulting curve was used to obtain the selectivity at a constant comparable value of 35% conversion.

The results show a significant improvement obtained with the modified catalyst. With catalyst containing much more than 6% silica the selectivities obtained are below those obtained with no silica at all.

It should be noted that the selectivity of the catalyst was significantly improved without affecting the activity. This result is unexpected for several reasons. Firstly, the effect of a large number of potential promoters or iron oxide dehydrogenation catalyst was investigated and no material improvement was observed. This work is reported at some length in the article by Kearby appearing in Ind. Eng. Chem. 42, 295 (1950). In this work, silica was tried as a base or support for the catalyst and was found to give an inferior catalyst.

The catalyst of the type in question is widely used in the dehydrogenation of ethyl benzene to styrene. In a rather comprehensive investigation of bauxites for this reaction reported by Wood and Capell in Ind. Eng. Chem. 37, 1148–1151 (1945) it is stated that the results indicate that within the limits tested silica has little or no effect on the activity of the bauxite.

Furthermore, as discussed at some length by Ciapetta, Dobres and Baker in "Catalysis VI" by Emmett, pages 513, 516 and 530 the incorporation of silica in dehydrogenation catalysts, especially when they also contain alumina, imparts acidity to the catalyst and this promotes cracking and isomerization reactions. This would be expected to decrease the dehydrogenation selectivity. It does not in the present catalyst probably because of the large excess of alkali present and the absence of any appreciable amount of alumina.

As stated above the operable percentages of added silica are from about 0.5% to about 6%. It is found that even though catalysts containing over 4% up to about 6% silica still have some selectivity advantage, catalysts containing above about 4% silica decline in activity at a somewhat faster rate. This is illustrated by the following example.

*Example II*

Catalysts A and B, similar in composition to the catalyst of Example I, were prepared with 3.8% added silica and 6% added silica, respectively. These catalysts were tested for the steam dehydrogenation of 2-butenes at 620° C. They were then used under drastic conditions (660° C.) for about 120 hours and then again tested at 620° C. The CS values $$\left(\frac{\text{percent conversion} \times \text{percent selectivity}}{100}\right)$$

of the fresh and used catalysts were determined as follows:

| Catalyst | Percent Silica | Fresh | Used | Percent Decline |
|---|---|---|---|---|
| A | 3.8 | 23 | 21 | 9 |
| B | 6.0 | 22 | 16 | 26 |

It is evident that catalyst B containing 6% silica declined approximately three times as fast as catalyst A containing 3.8% silica under the conditions of the test.

Since greater amounts of the desired product at any given degree of conversion are obtained when effecting the dehydrogenation with the modified catalyst, the dehydrogenation process may be run at a lower conversion than the present and still obtain the same amount of the desired product with a smaller degradation of valuable feed; or the process may be run at the same conversion to obtain a greater amount of the desired product while still obtaining less degradation of valuable feed; or, in the alternative, the dehydrogenation may be carried to a higher conversion thereby increasing the amount of product on a once through basis without any increase in the percentage of feed degraded. This improvement which is obtained with the catalyst of the invention in the dehydrogenation of hydrocarbons in terms of percent yield or rate of production from a given supply of raw materials or a combination of both factors is very significant over a period of time in view of the demand for products such as butadiene and styrene and the effect of small differences in production cost on such demand.

This application is a continuation-in-part of our copending application Serial No. 630,077, filed December 24, 1956, now abandoned.

We claim as our invention:

1. Process for the substantially continuous dehydrogenation of a hydrocarbon selected from the group consisting of olefins and alkyl aromatics to give predominantly the corresponding diolefin and vinyl aromatic hydrocarbon, respectively, which comprises passing said hydrocarbon together with from 2 to 30 moles of steam per mole of hydrocarbon at a temperature between about 580 and 700° C. in contact with a catalyst consisting substantially entirely of at least 35% iron oxide calculated as $Fe_2O_3$, a compound of potassium other than the chloride equivalent to at least 6% $K_2CO_3$, and having intimately dispersed in the potassium compound phase between about 0.5 and 6% silica.

2. Process for the substantially continuous dehydrogenation of a hydrocarbon selected from the group consisting of olefins and alkyl aromatics to give predominantly the corresponding diolefin and vinyl aromatic hydrocarbon, respectively, which comprises passing said hydrocarbon together with from 2 to 30 mols of steam per mole of hydrocarbon at a temperature between about 580 and 700° C. in contact with a catalyst consisting substantially entirely of from 45 to 85% of iron oxide calculated as $Fe_2O_3$, a potassium compound other than the chloride equivalent to about 8 to 55% $K_2CO_3$, and having intimately dispersed therein between 0.5 and 6% of silica.

3. Process according to claim 2 further characterized in that the catalyst contains a small amount between about 1 and 10% of an oxide of a metal selected from a group consisting of Cr, Mn, Bi, W, Mo and Ce.

4. Process according to claim 3 wherein said metal is chromium.

5. Process according to claim 2 wherein the silica is added to the catalyst in the form of potassium silicate.

6. A new dehydrogenation catalyst adapted for the steam dehydrogenation of olefins and alkyl aromatics consisting of from 45 to 85% of iron oxide calculated as $Fe_2O_3$, potassium carbonate in an amount equivalent to 8 to 55% $K_2CO_3$, a small amount between about 1 and 10% of chromium oxide, and between 0.5 and 6% of silica introduced in the form of a water-soluble potassium silicate.

References Cited in the file of this patent

UNITED STATES PATENTS

| | | |
|---|---|---|
| 2,461,147 | Davies et al. | Feb. 8, 1949 |
| 2,487,564 | Layng | Nov. 8, 1949 |
| 2,666,086 | Pitzer | Jan. 12, 1954 |
| 2,754,345 | Kirshenbaum | July 10, 1956 |
| 2,865,844 | Kirshenbaum | Dec. 23, 1958 |